United States Patent [19]

Oglesby, Jr.

[11] 3,709,159
[45] Jan. 9, 1973

[54] FOLDING SERVING TABLE

[75] Inventor: Ira D. Oglesby, Jr., Fort Smith, Ark.

[73] Assignee: Fort Smith Table and Furniture Co., Fort Smith, Ark.

[22] Filed: Jan. 22, 1971

[21] Appl. No.: 108,919

[52] U.S. Cl. .................. 108/44, 108/129, 108/132
[51] Int. Cl. .................................................. A47b 23/00
[58] Field of Search .......................... 108/42–49, 89, 108/99, 129–132

[56] References Cited

UNITED STATES PATENTS

| | | | |
|---|---|---|---|
| 3,072,451 | 1/1963 | Greenburg et al. | 108/132 X |
| 1,965,955 | 7/1934 | DeFoe et al. | 108/46 |
| 2,471,730 | 5/1949 | Doerr | 108/44 X |
| 2,249,845 | 7/1941 | Mitchell | 108/129 X |
| 2,572,474 | 10/1951 | Hamilton | 108/132 |
| 2,720,436 | 10/1955 | Corey | 108/44 X |
| 3,394,666 | 7/1968 | Pearlman | 108/129 |

Primary Examiner—Bobby R. Gay
Assistant Examiner—Glenn O. Finch
Attorney—Cohn and Powell

[57] ABSTRACT

This folding table is for use in conjunction with an automobile trunk and includes a folding leg frame at one end and an adaptor at the other end. The adaptor includes a downwardly projecting lug receivable by the automobile trunk lock socket and the lug is rotatable to a storage position when not in use. A second folding leg frame at the adaptor end of the table allows the table to be used conventionally and the adaptor lug is attached to the leg frame so that when the frame is unfolded for conventional use, the adaptor lug is rotated to a non-use position. The lug is pivotally attached to the crossbar of the leg frame to further facilitate storage.

6 Claims, 4 Drawing Figures

PATENTED JAN 9 1973   3,709,159

INVENTOR
IRA D. OGLESBY JR.

By Cohn and Powell

ATTORNEYS

FOLDING SERVING TABLE

BACKGROUND OF THE INVENTION

This invention relates in general to a folding table and in particular, to a table which is adaptable for use with the trunk of an automobile.

There are many occasions, for example, on picnics and camping trips, where it is awkward to erect a conventional table because of the uneven nature of the ground. Even when adjustable legs are used, the leveling of the four points of support is difficult and time consuming.

Further, there are times when it is an advantage to have a table which is not only adequately supported but is, in addition, securely anchored to a relatively fixed object to prevent transverse sway.

Folding tables for use with automobiles are known in the art but in general, they are used in conjunction with an automobile bumper rather than the trunk. Such tables tend to be complicated in that they have sliding parts, or parts which must be unbolted or otherwise dismantled for storage. Moreover, these tables are subject to the disadvantage that they do not have the capability of being used as conventional tables.

Known tables which have the capability of being mounted in some way to an automobile trunk suffer the disadvantage that additional parts must be provided, permanently fixed to the automobile before the tables can be used.

SUMMARY OF THE INVENTION

This folding table is used in conjunction with an automobile trunk. It is connected to the trunk lock socket at one end and supported on legs at the other end and this arrangement provides stability with a minimum of adjustment. Further, because of its attachment to an automobile, the table is securely anchored to preclude inadvertent transverse movement.

The adaptor by which the table is connected to the automobile may be easily placed in a storage condition so that it does not interfere with the foldable legs which are provided at the adaptor end of the table and which permit the table to be used in a conventional manner. The structural connection between the adaptor and these legs provides that the adaptor is in operative location when the legs are rotated into a folded storage condition.

No sliding or dismantling of parts is required for erection and the table presents a structure which is inexpensive to manufacture and very simple to use.

The folding table includes a table top having opposed ends. Foldable legs provide the support means at one end of the table and the table is supported at the other end by the automobile trunk rear side wall, a depending adaptor being provided which is receivable by the trunk lock socket and which substantially precludes forward and rearward movement of the table top. The adaptor end is provided with optionally usable legs to convert the table to conventional use when desired.

The legs at each end of the table are provided by substantially similar frames, each of which includes a pair of legs interconnected by a crossbar member which is journal mounted to the underside of the table top. The adaptor is mounted to the crossbar of the frame at the trunk end of the table and the adaptor includes a lug carried by the crossbar for rotation into an operative depending position transversely disposed of the crossbar when the legs are in the folded position. The adaptor lug is pivotally mounted to the crossbar for rotation from the transverse, operative position to a position parallel with the crossbar to facilitate storage.

The leg frames are asymmetrical and are endwise reversed to avoid interference with each other in the folded condition. The individual legs are formed from telescopically related portions for length adjustment to provide a level table top.

DESCRIPTION OF THE PREFERRED EMBODIMENT

Figure 1:
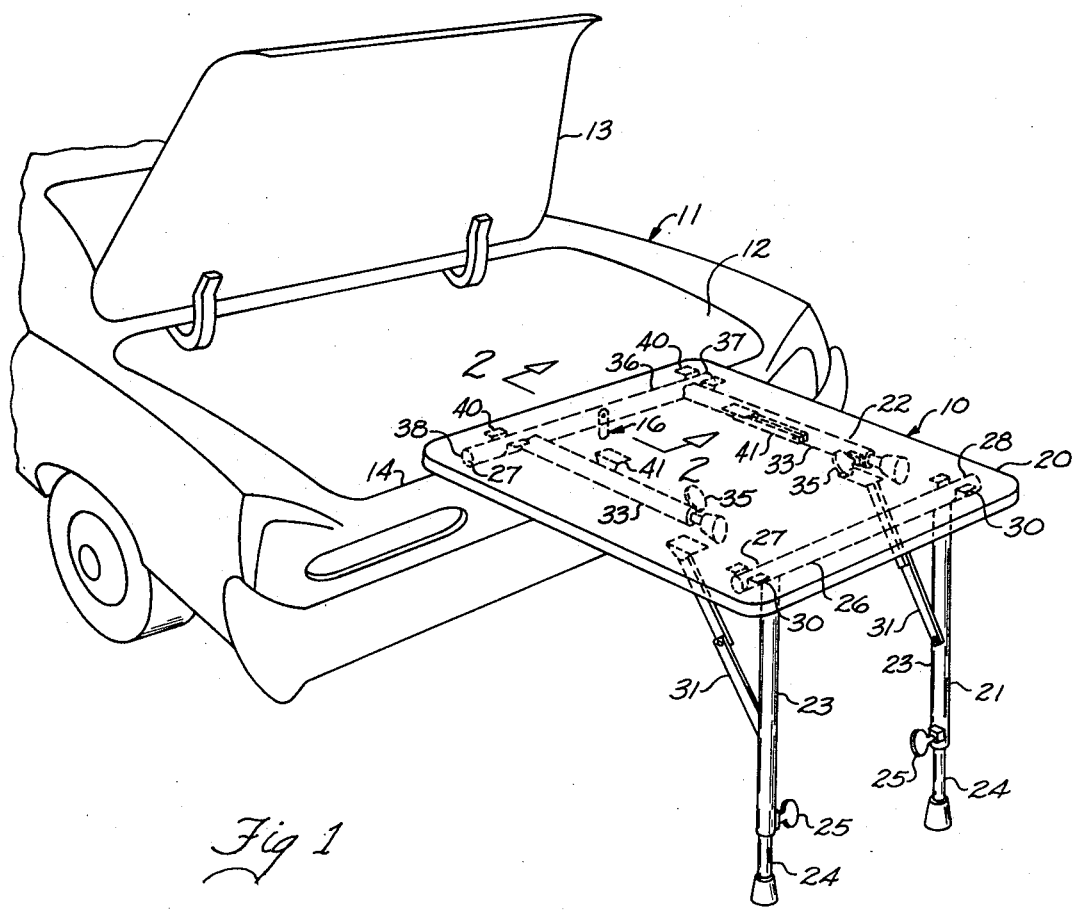
FIG. 1 is a perspective view of the table used in conjunction with the trunk of an automobile.

Referring now by characters of reference to the drawing and first to FIG. 1, it will be understood that the folding table 10 is used in conjunction with an automobile 11 having a trunk compartment, generally indicated by numeral 12. FIG. 1 illustrates the trunk 12 with the trunk lid 13 in the open position. The automobile 11 is conventional in that the trunk 12 is defined in part by a rear side wall 14 which, as clearly shown in FIG. 2, includes a lock socket 15 capable of receiving a downwardly depending lug 17 of an adaptor, generally indicated by numeral 16.

Referring more specifically to the table 10, said table 10 includes a table top 20 and opposed foldable frames 21 and 22 constituting support means at opposite ends of the table top 20. Frame 21 at the adaptor end of the table and frame 22 at the other end of the table are substantially similar to each other with regard to their general configuration but will be described separately. Frame 21 includes a pair of legs 23 having extendable telescopic portions 24 secured by thumbscrews 25. A crossbar 26 interconnects the legs 23 and constitutes a shaft. The crossbar 26 is provided with overhanging portions 27 and 28, said portions having different lengths and being rotatively connected to the table top 20 by means of journal clips 30 which are disposed adjacent associated legs to preclude lateral movement of the crossbar 26. It will be observed that the frame 21 is somewhat unsymmetrical in that the legs are offset from the center line of the table top 20 to avoid interference with the frame 22. Conventional folding braces 31 insure that the legs 23 are securely held in the open position.

Except for the adaptor 16 attached thereto, the frame 22 is essentially similar to the frame 21. Frame 22 includes a pair of legs 33 having telescopic portions 34 shown in the retracted position in FIG. 1 and secured by thumbscrews 35. A crossbar 36 interconnects the legs 33 and constitutes a shaft having overhanging portions 37 and 38 rotatively mounted to the table top 10 by means of journal clips 40 adjacently disposed of associated legs 33 to preclude lateral movement of the crossbar 36. Braces 41 are provided by which the frame 22 may be held in a downwardly depending support position when the table is used as a connectional four-legged table. Essentially, the frames 21 and 22 have a similar configuration but are endwise reversed to provide for nesting of the frames relative to each other.

Figure 2:
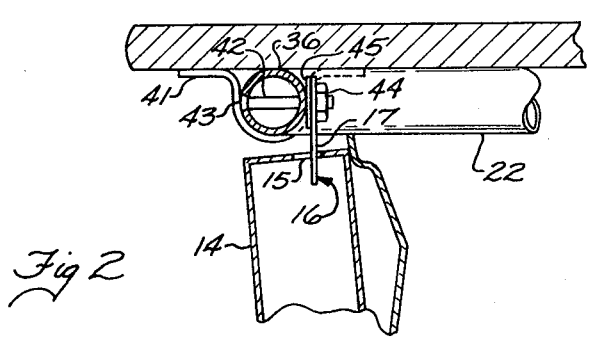
FIG. 2 is a sectional view taken on line 2—2 of FIG. 1 showing the adaptor lug in the operative position and the associated legs in the folded position.
Figure 4:
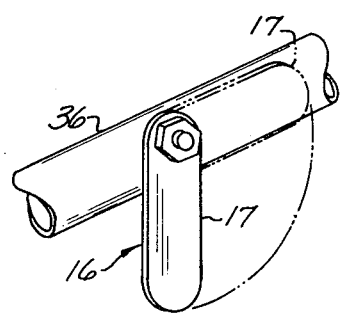
FIG. 4 is a fragmentary perspective view showing the pivotal capability of the adaptor lug.
Figure 3:
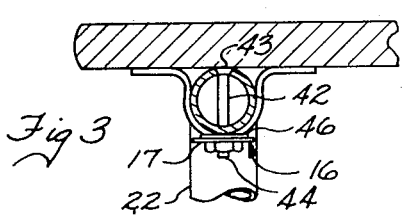
FIG. 3 is a similar view to FIG. 2 showing the adaptor lug in a storage position and the associated legs in a support position.

Referring now specifically to the adaptor 16, illustrated with particularity in FIGS. 2, 3 and 4, it will be understood that the adaptor 16 includes a lug 17 pivotally attached to the crossbar 36 of the frame 22 by means of a rivet 42 having a substantially flat head 43. The flat head 43 is recessed relative to the crossbar 36 and the rivet 42 includes a flattened end 44 retaining the lug 17. A washer 45 is provided between the lug 17 and the crossbar 36 to facilitate rotation of said lug 17 between the position shown in FIG. 4, in which it is disposed substantially perpendicularly to said crossbar 36, and a position, shown in dotted outline in FIG. 4, in which it is disposed substantially in parallel relation to the axis of said crossbar 36 to facilitate storage of said lug 17.

It will be understood that the table 10 can be used as a conventional four-legged table by simply rotating each of the frames 21 and 22 outwardly from its inwardly folded position to a downwardly depending position in which all four legs are used as support elements, the lengths of the legs being suitably adjusted to provide a level table top 20. In this position, the adaptor lug 17 is disposed in parallel relation to its associated crossbar 36 and in no wise obstructs the legroom or interferes with the operation of the table in any other way. When, on the other hand, it is desired to use the table 10 in conjunction with an automobile trunk, the frame 22 is maintained in the folded, storage position. The adaptor lug 17 may thus be easily pivoted by hand to an outwardly projecting, downwardly depending position and hooked, as it were, into the socket 15 of a trunk lock as shown in FIG. 2. The frame 22, and therefore the adaptor end of the table top 20, is supported on the trunk rear side wall 14, and it will be understood that the engagement of the lug 17 within the socket 15 precludes substantially transverse movement of the table top relative to the automobile 11. The other end of the table 10 is, of course, supported, as shown in FIG. 1, by the outwardly folded, downwardly depending legs 23 of the frame 21 and the telescopic portions 24 of the legs 23 are adjusted until the table top is level.

When it is desired to store the table 10, the lug 17 is simply rotated into the position shown in dotted outline in FIG. 4 and the frame 21, which is disposed in staggered relation relative to the frame 22, is inwardly folded to the storage position. The table 10 having both frames 21 and 22 folded and retained by clips or other conventional means (not shown), may then be conveniently placed in the automobile trunk 12 or other convenient storage place.

I claim as my invention:

1. A folding table for use with an automobile having a trunk lock socket comprising:
   a. a table top including opposed ends,
   b. support means at one end of the table top including a pair of foldable legs attached to said table end, and
   c. support means at the other end of the table top including a depending adaptor means, adapted to be received by the trunk lock socket in liftably removable relation to preclude substantial transverse movement of said table top in a rearward direction
   d. the table top includes journal means at said other end, and
   e. the adaptor means includes:
      1. a shaft rotatively received by the journal means, and
      2. a transverse lug receivable by the socket and attached to the shaft, said lug being selectively rotatable with the shaft from the downwardly depending position to a storage position.

2. A folding table as defined in claim 1, in which:
   f. the lug is pivotally attached to the shaft for rotation relative to the shaft whereby the lug is parallel with the shaft in the storage position.

3. A folding table optionally usable with an automobile having a trunk lock socket comprising:
   a. a table top including opposed ends,
   b. support means at one end of the table top including a pair of inwardly foldable legs attached to said table top, and
   c. support means at the other end of the table top including:
      1. a depending adaptor lug selectively receivable in unlatched relation by the trunk lock socket to preclude substantial transverse movement of the table top in a rearward direction, and
      2. a pair of foldable legs attached to said table top and selectively foldable to a storage position when the adaptor lug is received by the trunk lock socket.

4. A folding table as defined in claim 3, in which:
   d. the table top includes journal means at said other end,
   e. the support means at said other end includes a frame having a pair of legs and an interconnecting crossbar providing a shaft received by the journal means for rotation of said legs from a position transverse to the plane of the table top to a storage position substantially parallel with the table top, and
   f. the adaptor lug is carried by the crossbar for rotation with the crossbar into an operative depending position transversely disposed of the crossbar when the legs are in the folded position.

5. A folding table as defined in claim 4, in which:
   g. the lug is pivotally mounted to the crossbar for rotation relative to the crossbar to a position substantially parallel to the crossbar.

6. A folding table optionally usable with an automobile having a trunk lock socket comprising:
   a. a table top including journal means at opposed ends,
   b. support means at one end of the table top including a frame having a pair of inwardly foldable legs and an interconnecting crossbar providing a shaft receivable by associated journal means for rotation of said legs from a support position transverse to the table top to a storage position substantially parallel with the table top, and
   c. support means at the other end of the table top including:

1. a frame having a pair of legs and an interconnecting crossbar providing a shaft receivable by associated journal means for rotation of said legs from a support position transverse to the table top to a storage position substantially parallel with the table top, and
2. a depending adaptor lug selectively receivable by the trunk lock socket to preclude substantial transverse movement of the table top in at least one direction, the adaptor lug being mounted in pivotal relation to the crossbar for selective rotation from a position substantially parallel to said crossbar to a position substantially perpendicular to said crossbar, whereby said lug depends from said crossbar when the legs are in the folded position, d. the legs at said one end including a telescopic portion whereby the length thereof may be adjusted to provide a level table top when said adaptor lug is received by said socket in the operative support position.

* * * * *